Patented May 16, 1939

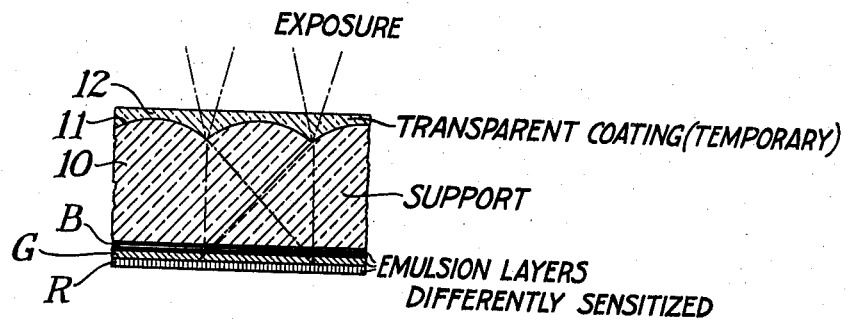
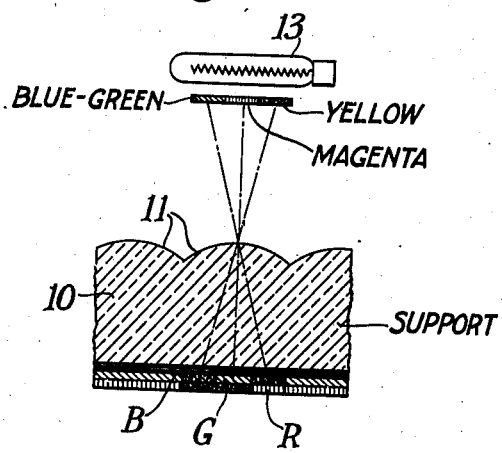
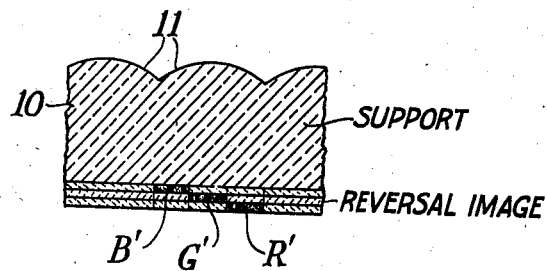

2,158,174

UNITED STATES PATENT OFFICE 2,158,174

FILM FOR PHOTOGRAPHIC COLOR PROCESS

John G. Capstaff, Rochester, N. Y., assignor to Eastman Kodak Company, Rochester, N. Y., a corporation of New Jersey Original application October 28, 1936, Serial No. 108,036. Divided and this application December 30, 1937, Serial No. 182,515

4 Claims. (Cl. 95—2)

This invention relates to photographic lenticular film in which the several color separation images occupy individual areas on the smooth face of a support and in registration with the lenticulations provided on the other face of the support and, more particularly to a film with which the separation of the color images are obtained photographically and useful in the process claimed in my copending application Serial No. 108,036, filed October 28, 1936, of which this is a division.

When pictures are taken on lenticular film through a multi-color filter associated with the objective the colored areas of the filter normally see the subject being photographed from different viewpoints. Pictures made in this manner are now known to possess a defect which appears in projection as color fringes on out-of-focus objects. This defect is believed to be due to the stereo parallax between the different color areas of the filter associated with the objective and in my copending application Serial No. 703,268, filed December 20, 1933, and in my Patent No. 2,091,699, granted August 31, 1907, I describe and claim a method and optical system for eliminating this defect by causing two or more of the filter areas to view the subject being photographed from a common point in space.

The present invention provides a sensitive element for use in a method for eliminating this defect and which, in addition thereto, makes it possible to record pictures on lenticular film without the necessity of providing a camera objective which must meet special requirements, such as a predetermined relative aperture or the apparent position of the multi-colored filter as viewed by the film.

In accordance with one aspect of my invention a lenticular support is provided on its plane surface with a plurality of differentially sensitized emulsions which may comprise separate layers, a single layer of mixed particles, or a combination of these, the primary sensitivity of each being for a different one of the component colors desired to be used in the process. The lenticular surface is rendered optically smooth and the resulting film exposed through the support to an image of the subject to be recorded. After exposure and before development the lenticulations are restored and a selective fogging exposure is given separate areas behind each lenticulation so that in each area a different one of the emulsions is unaffected. Alternatively the selective fogging exposure may be given before the camera exposure and before the lenticulations are rendered optically smooth. The film is then developed by a reversal process to provide a resulting film in which the color separation images are in registration behind the lenticulations. This film will not contain the above-mentioned color fringing effect since all of the color separation views were exposed through the same lens aperture and it may be projected in any well known manner or printed onto a copy film by any suitable process.

The invention, as broadly outlined above, includes several novel and advantageous features among which may be included the necessity of no special camera optics. The camera exposure is considerably reduced over that required for exposing lenticular film since the color separation is accomplished subtractively rather than additively and the definition, and, accordingly, the color rendition, is greatly improved by combining the best features of both the subtractive and additive color process while eliminating the necessity of adopting their weaknesses.

In accordance with another aspect of my invention I may dispense with the temporary removal of the lenticulations during the camera exposure by arranging the film with its emulsion side facing the incident light. To insure the proper registration of the final images, the selective fogging exposure will of course be given through the support either before or after the camera exposure. While this method of practicing the process of my invention is a very simple one, the spectral sensitivity of the emulsions at present available is not entirely satisfactory for the ordinary three component colors because of the requirement that the several emulsions must be selectively exposed with light incident thereon first from one side and then from the other side. This difficulty is not insurmountable, however, and the employment of infra red radiation in connection with suitable emulsions for making one of the selective fogging exposures makes it possible to practice the process by this particular method.

Still another way is available for dispensing with the removal of the lenticulations during the camera exposure if the user is willing to employ a camera objective having an aperture which meets the requirement demanded by the apertures of the film lenticulations. In this case the camera exposure would be made through the lenticulations and due to the absence of a multicolor filter at the camera objective, the camera exposure necessary would not be increased. In some subjects color fringing on out-of-focus objects would be introduced but if such fringing could not be tolerated it could be eliminated as taught in my above identified application.

If the film resulting from the process of my invention is to be employed to print in any well known manner on film other than lenticular film, the lenticulations on the original film may be made having smaller relative apertures, such as f3.5, thereby making it practical to employ more lenses per unit area, to employ a thicker support and the lenses on the film will have a greater depth of focus which improves the definition.

The novel features which I believe to be characteristic of my invention are set forth in the appended claims. The invention itself, however, will be best understood by reference to the following description when read in connection with the accompanying drawing in which, Fig. 1 shows on an enlarged scale a lenticular film provided with a monopack of differently sensitized layers and a coating for optically removing the lenticulations;

Fig. 2 illustrates diagrammaticaly an arrangement for selectively fogging certain areas of the monopack layers; and Fig. 3 illustrates the developed picture film resulting from the method of the invention.

In the practice of my invention a transparent support provided with a plurality of differentially sensitized emulsion particles or layers is exposed to a colored image before or after which the uncoated face of the support is provided with lenticulations. These lenticulations may be embossed upon the support after the camera exposure or embossed thereon at some prior time. Due to a number of difficulties involved in embossing a support having an exposed layer thereon without damaging the latent image, I prefer to employ a lenticular support and optically remove the lenticulations for making the original exposure when such exposure is to be made through the support.

The preferred form of the invention is illustrated in Fig. 1 as comprising a transparent support 10 having minute lenticulations 11 on one of its faces and a plurality of differentially sensitized layers indicated as B, G and R on its other face. The lenticulations 11 are covered with a smooth layer 12 of some suitable readily removable transparent substance which preferably has a refractive index approximating the refractive index of the support 10, whereby the lenticulations 11 are optically removed. This temporary coating 12 may conveniently be a broken down and readily soluble gelatin or glue which may be satisfactorily removed in cold water. The exact composition of the coating 12 will, of course, vary somewhat with the nature of the support 10 and in order to secure the proper cohesion between the coating 12 and the support 10, it may be necessary, in some cases, to first apply a sub coating thereto or to include in the gelatin solution a material having a slightly solvent action upon the support 10. A suitable subbing coating for most present day commercial film base may comprise a mixture of 30% acetone 2% gelatin and water and applied to the film at approximately a temperature of 100° F. The above examples are given merely to indicate two satisfactory procedures and anyone skilled in the art will experience no difficulty in practicing the invention by following the procedures and, of course, other well known materials may be employed for the removable layer 12.

The number of emulsion layers provided on the support 10 will depend upon the number of component colors it is desired to record or employ in the process, but, inasmuch as it is the common practice to employ three colors, I will describe my invention in detail as applied to a three-color process. The actual colors chosen will depend upon the user and I have shown the emulsion layers as being differentially sensitized to approximately the blue, green and red as indicated respectively by the reference characters B, G and R. Monopacks of this type are well known and, if desirable, certain of the layers may contain dyes for screening purposes and for controlling the gammas of the respective layers as is well known. For example, the first layer B will preferably contain a yellow dye which will not transmit an appreciable amount of blue light to the layers G and R when the monopack is exposed through the support 10. Although the screening layers may comprise separate layers between the emulsion layers B, G and R, I prefer to incorporate any such screening layers directly in the emulsions in the interest of keeping the combined thickness of the monopack layers at a minimum for purposes well known, such as reducing color splashing and improving definition.

The film above described, is exposed through the support 10 to a color image which results in a latent image being present in each of the emulsion layers in accordance with the color characteristics of said image, as is well known. The temporary layer 12 of soluble transparent, varnish is then removed as, for instance, by washing in cold water for about ten minutes if broken down gelatin has been employed for the layer 12. The film, with the lenticulations 11 restored as shown in Fig. 2, is then uniformly exposed to differently colored light in such a manner that separate areas of the monopack emulsion are exposed to light of a single color and the location of these separate areas are controlled by the lenticulations 11, this exposure may readily be accomplished in the ordinary manner employed for exposing lenticular film and a conventional arrangement is shown in Fig. 2 as comprising a light source 13 which illuminates the film 10 through a banded filter, each band of which transmits light minus a different one of the colors for which the emulsion layers B, G and R are sensitive, that is, a blue-green zone transmits minus red light and the light transmitted by this zone and directed to an individual area behind the lens element 11 will not expose the layer R, but will uniformly fog the blue and green layers B and G. In a similar manner the magenta zone of the filter transmits minus green light which fogs the blue and red sensitive layers but does not affect the green sensitive layer and the yellow zone of the filter transmits minus blue light which does not affect the blue sensitive layer but uniformly exposes the green and red layers. This supplemental or printing exposure thus leaves three unfogged areas in three different layers in registration with each lenticulation 11 and upon development of the film by a reversal process the fogged areas in the different layers are completely bleached and become transparent and there remains only a positive silver image distributed in the three layers in registration with the lenticulations 11 as shown in Fig. 3. These three positive images B', G' and R' correspond in density to the amount of blue, green and red light in the original color image to which the film was exposed and since these three images are in registration with the lenticulations 11, the result is a color separation image of the ordinary lenticular film color process and it can be printed or projected in the regular manner.

It will, of course, be understood that the lenticulations 11 are very small and that what has been described as happening behind a single lenticulation happens behind all of the lenticulations. It is also to be understood that the exposing arrangement shown in Fig. 2 is diagrammatic in order to render this step of the process easily understandable and that, in practice, a conventional setup employing an objective lens associated with the banded filter may be used in much the same manner as it is at present used in cameras and printers for exposing lenticular film. Preferably the film will be moved non-intermittently through the printer.

If the camera exposure is to be made with the emulsion side of the film facing the incident light the emulsion layers will be arranged in a different order so that the several colors will be properly recorded. The fogging exposure step illustrated in Fig. 2 will be accomplished in the same general way but with such changes as to insure the desired selective fogging.

If the camera exposure is made through the lenticular support and with the emulsion layers in order shown in Fig. 1 a gain in definition is secured by reason of the chromatic aberration of the lenticulations working in the right direction, i. e., the blue light is brought to a focus first and the blue sensitive layer is the closest to the lenticulations. Also the scatter of wavelengths tends in the same direction as the order of the layers.

It will be evident that in the present process the color separation in the several layers depends alone on the latent image formed as a result of sensitizing and screening and is not further complicated by the necessity of controlling the penetration of dyes and bleaching solutions as is the case when the process is completely a subtractive one. Also that the emulsion layers may much more sensitive than corresponding layers employed in films of the catalytic bleach type.

It will also be evident to those skilled in the art that the camera exposure is greatly reduced by obtaining the color separation subtractively instead of by an additive process.

It will be obvious to those skilled in the art that the specific structure of the film may be modified without departing from the spirit of my invention, the scope of which is pointed out in the appended claims.

What I claim as new and desire to secure by Letters Patent of the United States is:

1. A film for use in a photographic color picture process comprising a transparent support provided with lenticulations on one of its faces and on its other face with a plurality of emulsion layers individually sensitized to different primary colors, said lenticulations and said layers being co-extensive with the picture area of the support, and a plano-surfaced layer of a removable transparent material covering and co-extensive with said lenticulations.

2. A photographic film comprising a transparent support provided on its entire front surface with minute lens elements, a plano-surfaced layer of a removable transparent substance covering and coextensive with said lens elements, an emulsion layer sensitive only to blue light carried by the rear surface of said support, two additional emulsion layers sensitized to green and red light, respectively, superposed on and behind said blue sensitive layer, and screening means in front of said green and red sensitized layers for absorbing blue light.

3. A film for use in a photographic color process comprising a transparent support provided with lenticulations on its front face and overlying its entire photographically useful area, a water soluble layer of broken down gelatin covering all of said lenticulations, the outer surface of said layer being substantially plano, a blue sensitive emulsion containing a yellow dye on the rear face of said support, and two additional emulsion layers sensitized to green and red, respectively, behind said blue sensitive layer.

4. A film comprising a base having minute lens elements entirely covering one side thereof, a removable plano-surfaced layer of a transparent material covering all of said lens elements for optically eliminating said lens elements, and three superimposed emulsion layers attached to the other side thereof, each of said layers being sensitized to a different one of the three primary colors, in combination with light filtering means adapted to shield two of the layers from light to which the other layer is sensitive.

JOHN G. CAPSTAFF.